(12) United States Patent
Kim (10) Patent No.: US 7,489,920 B2
(45) Date of Patent: Feb. 10, 2009

(54) MOBILE COMMUNICATION TERMINAL

(75) Inventor: Wang Jin Kim, Gwangmyeong-si (KR)

(73) Assignee: LG Electronics Inc., Seoul (KR)

( * ) Notice: Subject to any disclaimer, the term of this patent is extended or adjusted under 35 U.S.C. 154(b) by 368 days.

(21) Appl. No.: 11/297,849

(22) Filed: Dec. 8, 2005

(65) Prior Publication Data

US 2006/0128361 A1   Jun. 15, 2006

(30) Foreign Application Priority Data

Dec. 9, 2004   (KR) .................. 10-2004-0103482

(51) Int. Cl.
*H04M 1/66* (2006.01)
*H04M 1/68* (2006.01)
*H04M 3/16* (2006.01)

(52) U.S. Cl. ............... 455/411; 379/433.13; 455/575.3

(58) Field of Classification Search ................ 455/411, 455/410, 575.1, 575.3, 575.4
See application file for complete search history.

(56) References Cited

U.S. PATENT DOCUMENTS

| | | | | |
|---|---|---|---|---|
| 6,249,672 | B1 * | 6/2001 | Castiel | 455/575.4 |
| 6,628,974 | B1 * | 9/2003 | Lim | 455/575.3 |
| 6,785,935 | B2 * | 9/2004 | Ahn et al. | 16/221 |
| 2005/0208903 | A1 * | 9/2005 | Sakamoto | 455/90.3 |
| 2006/0046792 | A1 * | 3/2006 | Hassemer et al. | 455/575.1 |
| 2006/0089181 | A1 * | 4/2006 | Gartrell | 455/575.3 |

FOREIGN PATENT DOCUMENTS

| | | |
|---|---|---|
| CN | 2499877 | 7/2002 |
| CN | 1499808 | 5/2004 |
| CN | 1516852 | 7/2004 |
| JP | 2002-368870 | 12/2002 |
| KR | 2000-6022 | 4/2000 |
| KR | 2002-39048 | 5/2002 |

OTHER PUBLICATIONS

Chinese IPO; Office Action in foreign application (CN 2005101297849) to which priority is claimed by the present application; Aug. 8, 2008.

* cited by examiner

*Primary Examiner*—Nick Corsaro
*Assistant Examiner*—Vladimir Magloire

(57) ABSTRACT

The present invention provides a mobile communication terminal, and more particularly, a folding-type mobile communication terminal provided with a locking device that selectively restricts use of the terminal via user authentication. In one embodiment, the present invention includes a housing including first and second housing portions mutually joined together via a hinge, wherein the housing can be opened and closed by rotation of the first and second housing portions about the hinge. An authentication means for enabling user authentication while the housing is closed is provided, wherein the authentication means is included on an exterior of the housing. Also a locking means is provided for preventing the housing from being opened while the user is not authenticated via the user authentication means, wherein the locking means is included in the housing.

5 Claims, 7 Drawing Sheets

MOBILE COMMUNICATION TERMINAL

CROSS REFERENCE TO RELATED APPLICATIONS

This application claims the benefit of Korean Application No. 10-2004-0103482 filed on Dec. 9, 2004, which is hereby incorporated herein by reference in its entirety.

BACKGROUND OF THE INVENTION

1. Field of the Invention

The present invention generally relates to a mobile communication terminal. More particularly, the present invention relates to a folding-type mobile communication terminal provided with a locking device that selectively enables opening of the terminal through user authentication.

2. Discussion of the Related Art

Recently, technological developments of mobile communication devices including mobile phones, PDAS, and the like have enabled such communication devices to provide to a user various modes of multimedia content, such as text messaging and other text-based services, still and video image content, games, etc., in addition to standard voice communication services. For instance, some mobile communication terminals are provided with an audio player capable of playing MP3 and other audio files while other terminals include a digital camera for capturing digital photos and videos. More recently financially-related functionality has been included on mobile communication terminals that enable a user to access an electronic passbook to engage in various transactions including account status inquiry, money wiring, cash-out, check status inquiry, even credit card purchasing.

As a consequence of the expanded capability of mobile communication terminals as explained above, it is often the case that important personal and financial information is stored in memory registers or other portions of the terminal. Hence, if the terminal is lost, confidential information contained in the terminal may undesirably fall into the hands of parties not otherwise authorized to access such information. This may unfortunately result in disclosure and misuse of the confidential information, including stolen identity and theft of funds. As such, a need exists in the art for a means by which sensitive and confidential information contained in a mobile communication terminal can be protected from unauthorized access.

SUMMARY OF THE INVENTION

Briefly summarized, embodiments of the present invention are directed to a mobile communication terminal that substantially obviates one or more problems due to limitations and disadvantages of the related art by providing a terminal having reinforced security features aimed at protecting sensitive, non-public, or confidential information and content contained in or accessible by the mobile terminal.

As embodied and broadly described herein, a mobile communication terminal according to the present invention includes a housing having first and second housing portions that are mutually joined together. In one embodiment the housing portions are joined via a hinge such that the housing portions define a "clamshell" design. So configured, the housing can be positioned in a closed state wherein both housing portions are disposed proximate one another, and an open state wherein the housing portions are rotated away from each other about the hinge.

An authentication means for enabling user authentication while the housing is in the closed state is also provided. The user authentication means is positioned on a portion of the housing exterior so as to be accessible when the housing is closed. The user authentication means can include one or more components including but not limited to a fingerprint identifier, an iris identifier, a voice identifier, and an authentication keypad.

A locking means for preventing the housing from being opened while a user is not authenticated via the user authentication means is also provided. The locking means is included with the housing and can be configured in one of several ways. Generally, however, the locking means includes an actuator included in one of the housing portions, an opening included in the other housing portion, and an actuating piece that is connected to the actuator and is configured to be selectively inserted in the opening. Thus, the actuating piece locks the housing in a closed state when the actuating piece is inserted in the opening.

In yet other embodiments, a housing opening detector can be included in the mobile communication terminal to alert the terminal when the housing is beginning to be opened by a user. When this occurs, the detector can prompt the user authentication means to display a message on an external display, prompting the user to authenticate so as to permit use of the terminal.

In addition to clamshell-type housings, other terminal configurations can employ the user authentication features of the present invention. For instance. the terminal housing can include two housing portions that are slidably engaged with one another via a track and rail arrangement. In addition to this, other housing configurations are also contemplated.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

In accordance with example embodiments of the present invention, a mobile communication terminal that is selectively accessible for use according to authentication of a user of the mobile terminal is provided. A mobile communication terminal configured in accordance with embodiments of the present invention can prevent unauthorized use of the mobile terminal, thereby protecting sensitive, privileged, or confidential content that may contained in or accessible by the mobile terminal. Thus, in one embodiment a mobile communication terminal according to the preset invention includes a housing having first and second housing portions that are movably joined to each other. The housing is provided with a locking device that is capable of maintaining the housing in a closed state. In addition, a user authentication system is provided to enable user authentication and thereby provide access to the mobile terminal by those who are properly authenticated. Optionally, the housing is further provided with a detector detecting whether the housing in either a closed or open state. A mobile communication terminal according to the preset invention is applicable to a folding, "clamshell," sliding-type, or other mobile terminal designs. Further details regarding particular details and applications of the present invention are explained in detail below.

Figure 1:
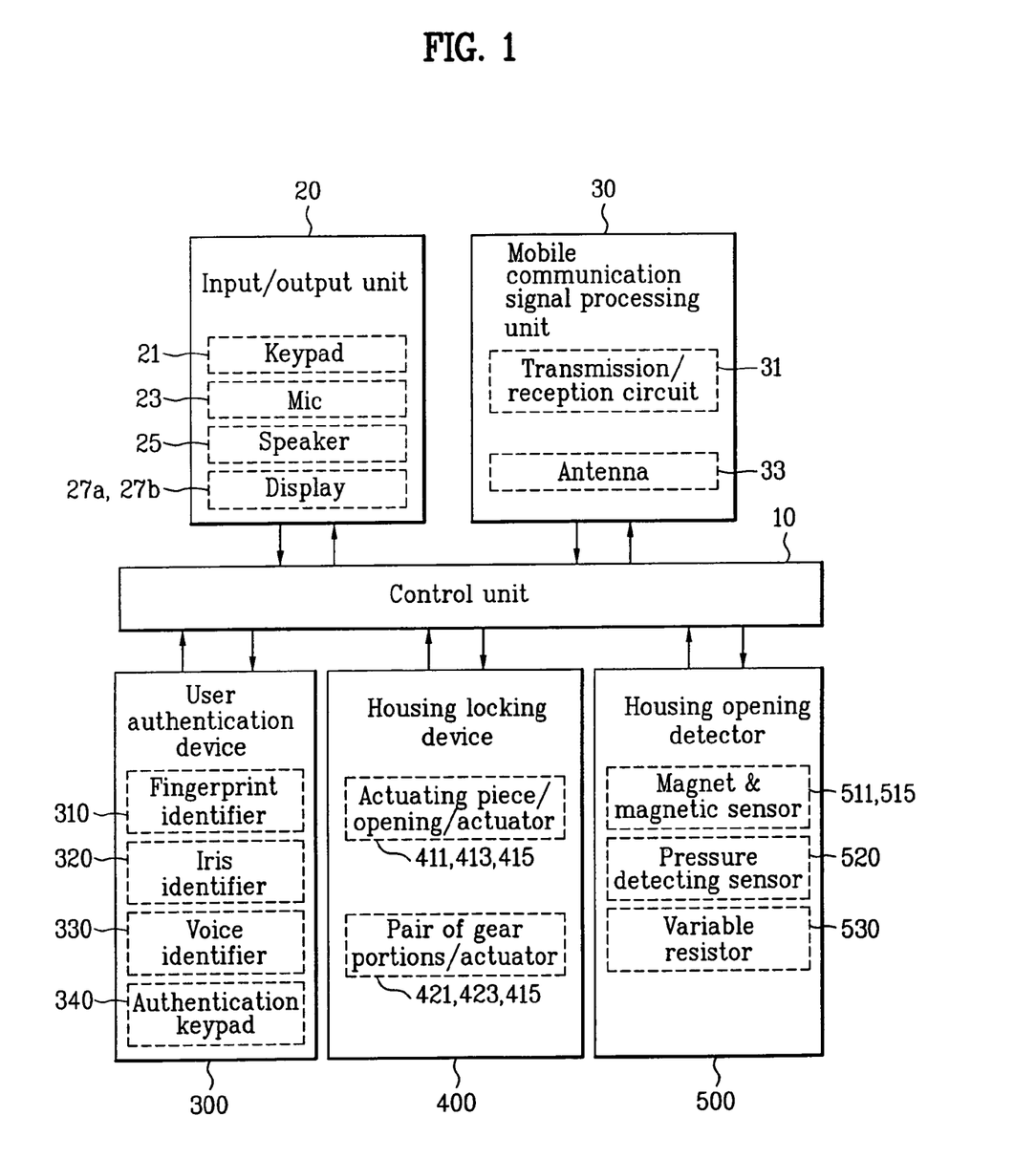
FIG. 1 is a schematic block diagram of a mobile communication terminal according to one embodiment of the present invention.
Figure 2:
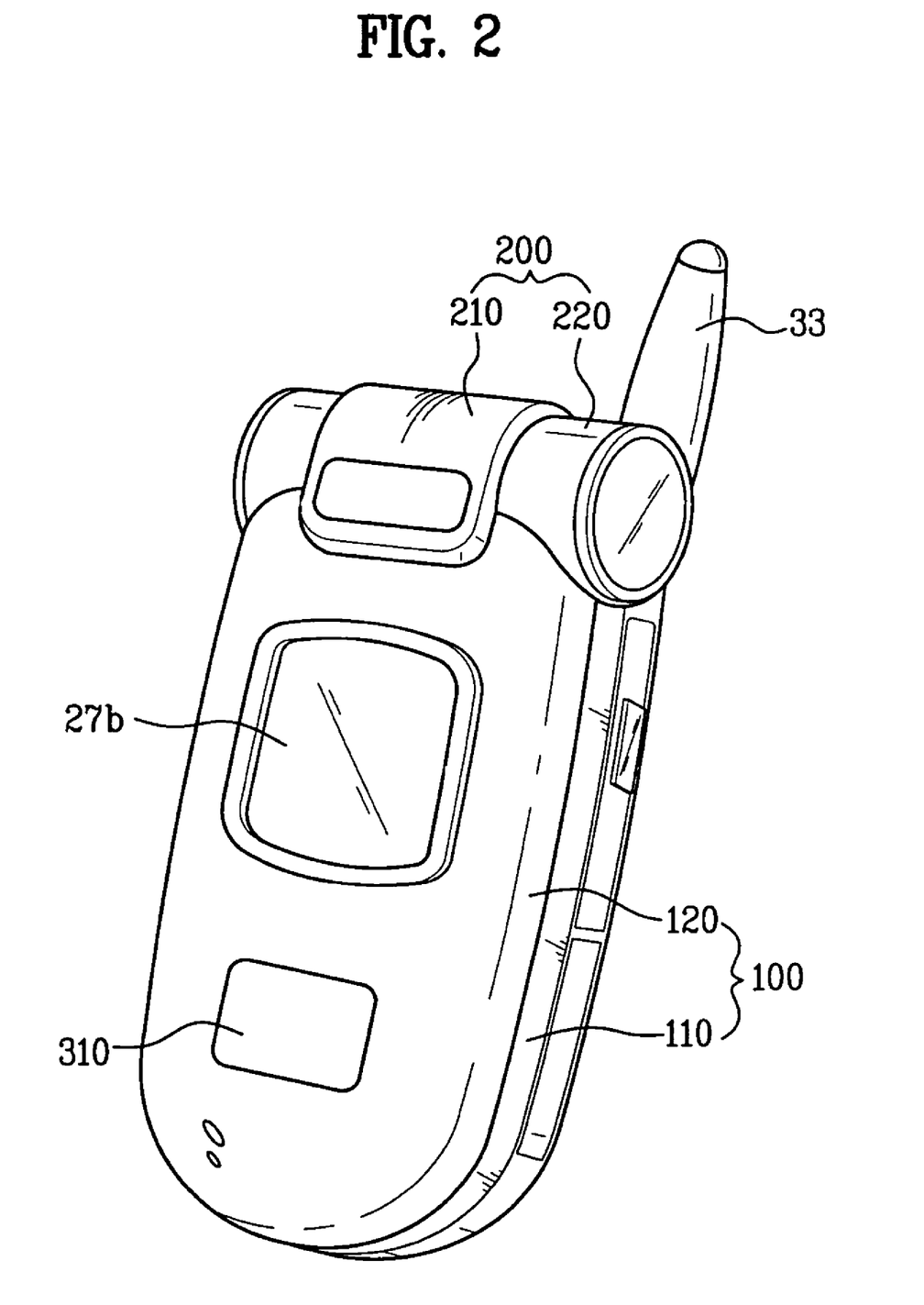
FIG. 2 is a perspective view of a mobile communication terminal according to one embodiment of the present invention.
Figure 3:
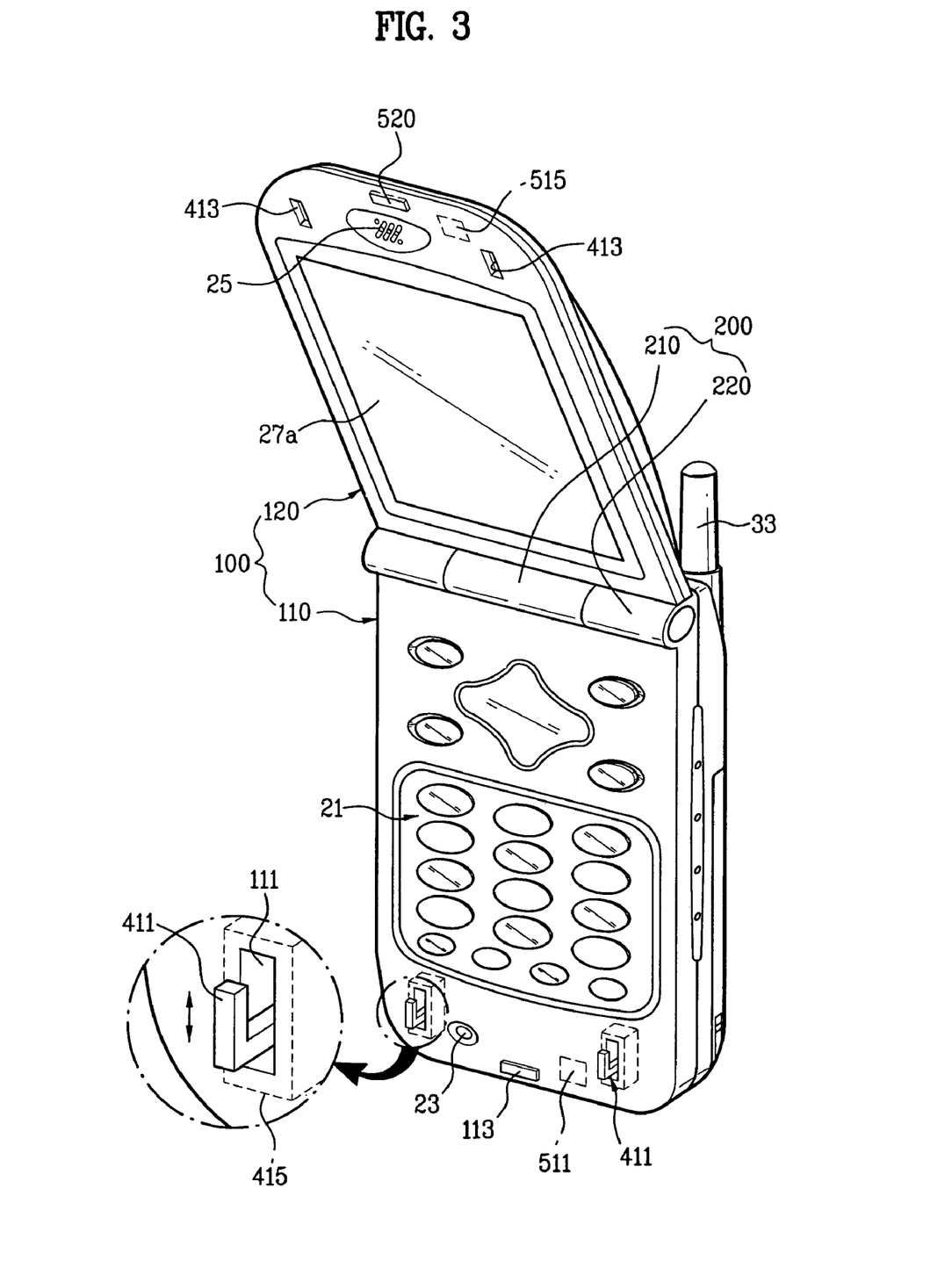
FIG. 3 is a perspective view of a mobile communication terminal according to one embodiment of the present invention, depicting an unfolded state of the mobile communication terminal.

By way of overview, FIG. 1 is a schematic block diagram of a mobile communication terminal ("terminal") according to one example embodiment of the present invention. FIG. 2 is a perspective view of a clamshell-type mobile communication terminal in a closed of folded state according to a one embodiment of the present invention, and FIG. 3 is a perspective view of a clamshell-type mobile communication terminal in an open or unfolded state according to one embodiment of the present invention. These figures depict various details of a configuration of a mobile communication terminal according to embodiments of the present invention that will be explained in detail with reference to the accompanying drawings as follows. Note, however, that the principles of the present invention are not limited to only the embodiments explicitly shown in the accompanying drawings, but rather can be extended to other terminals and devices including cell phones, PDS, laptop computers, portable email messengers, digital cameras and camcorders, etc.

Referring to FIG. 2 and FIG. 3, the terminal includes a housing 100 that in turn includes a first housing portion 110 and a second housing portion 120 that are movably joined together by a hinge 200. The hinge 200 can have one of a variety of specific configurations such that the first and second housing portions 110 and 120 rotate with respect to one another about the hinge 200 between an open or unfolded state and a closed or folded state. This type of terminal configuration is popularly known as a "clamshell" design, though it is noted that other terminal configurations can also benefit from the disclosure of the present invention.

An input/output unit 20, as shown in FIG. 1, is included with the housing 100 to permit input/output of a signal or other information with respect to the terminal. For instance, in one embodiment the input/output unit 20 includes a keypad 21, a microphone 23, a speaker 25 and displays 27a and 27b. In the present case the keypad 21 and the microphone 23, as shown in FIG. 3, are provided to an upper surface of the first housing portion 110, while the speaker 25 and a main display 27a of the displays 27a and 27b are provided to a lower surface of the second housing portion 120. Hence, if the housing 100, as shown in FIG. 2, is closed, the keypad 21, the microphone 23, the speaker 25, and the main display 27a are inaccessible from the outside of the terminal. As the auxiliary display 27b of the displays 27a and 27b, as shown in FIG. 2, is provided to an upper surface of the second housing portion 120, however, a user can view the auxiliary display 27b even if the housing 100 is closed. It is noted here that, while FIGS. 2 and 3 depict one possible configuration, the components of the input/output unit 20 can be configured and arranged in various other formats, according to terminal design as appreciated by one skilled in the art.

A mobile communication signal processing unit 30 is provided to the housing 100 to send/receive signals to/from a base station or location or device. The mobile communication signal processing unit 30 includes a transmission/reception circuit 31 and an antenna 33 configured both to transmit a radio wave or other suitable signal processed by the transmission/reception circuit 31 and to receive an external radio wave or signal. The transmission/reception circuit 31 includes a transmission signal processing unit (not shown in the drawing) involved in the transmission of a signal or other information inputted via the input/output unit 20 or information stored in a memory of the control unit 10. Similarly, a reception signal processing unit (not shown in the drawing) is included in the transmission/reception circuit 31 and is involved in processing a radio signal or other signal received from outside the terminal.

As the configurations of the input/output unit 20, displays 27a and 27b, mobile communication signal processing unit 30 and control unit 10 provided to the housing 100 are similar to those provided in a general mobile communication terminal, further details regarding the configuration and operation of these components are omitted except as further discussed below.

In an example embodiment, an authentication device 300, as shown in FIG. 1, enabling authentication of a user registered to the mobile communication terminal according to the present invention is provided to the housing 100 as part of the terminal. The authentication device 300 is provided to an exterior of the housing, e.g., the upper surface of second housing portion 120. In this way, a user can access the authentication device 300 even if the housing 100 is closed. In the present embodiment, the authentication device 300 is implemented as a fingerprint identifier 310 positioned on the upper surface of the second housing portion 120, as shown in FIG. 2. Other positioning schemes for the authentication device 300 are also possible, including the lower surface of the housing portion 110, for instance.

As demonstrated above, the authentication device 300 can be implemented on the housing 100 in a variety of ways. As shown in FIG. 2, for example, the fingerprint identifier 310 is included on the housing 100 and is employed to authenticate a user by reading a user's fingerprint and by comparing the read fingerprint to a registered fingerprint on an authentication list stored or accessed by the terminal. In other embodiments, other authentication devices can be employed. As shown in FIG. 1, such authentication devices can include an iris identifier 320 that authenticates a user by reading a user's iris and by comparing the read iris to a registered iris of an authentication list, and a voice identifier 330 that authenticates a user by reading a user's voice and by comparing the read voice to a registered voice of an authentication list.

In yet another embodiment, an authentication keypad 340 (FIG. 1 and FIG. 6) can be used as the authentication device 300. The authentication pad 340 is provided to an exterior of the housing 100, e.g., the upper surface of the second housing portion 120. In this way, a user can be authenticated by inputting a user authentication code using the authentication keypad 340 while the housing 100 is closed. Additional details regarding use of an authentication keypad are provided further below.

As the fingerprint identifier 310, the iris identifier 320, the voice identifier 330, and similar authentication devices are generally known in the art, detailed descriptions of the configuration and operation of these and devices is not included here, except as provided below.

As shown in FIG. 1, a housing locking device 400 is provided to the housing 100 to prevent the closed housing 100 (FIG. 2) from being opened without user authentication via the authentication device 300. In the present embodiment, the locking device 400 locks the housing 100 when the housing 100 is closed. Correspondingly, the locking device 400 releases the locking of the housing 100 when a user is authenticated by the authentication device 300.

Figure 4A:
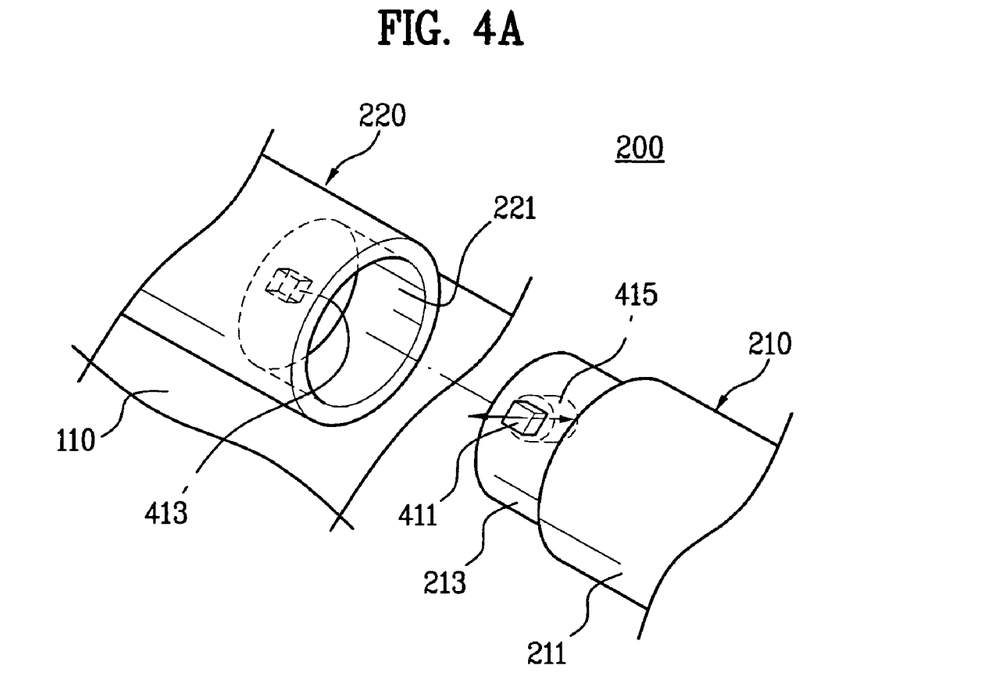
FIGS. 4A, 4B, and 5 are each exploded perspective diagrams of a locking device included in a hinge in a mobile communication terminal according to one embodiment of the present invention.
Figure 4B:
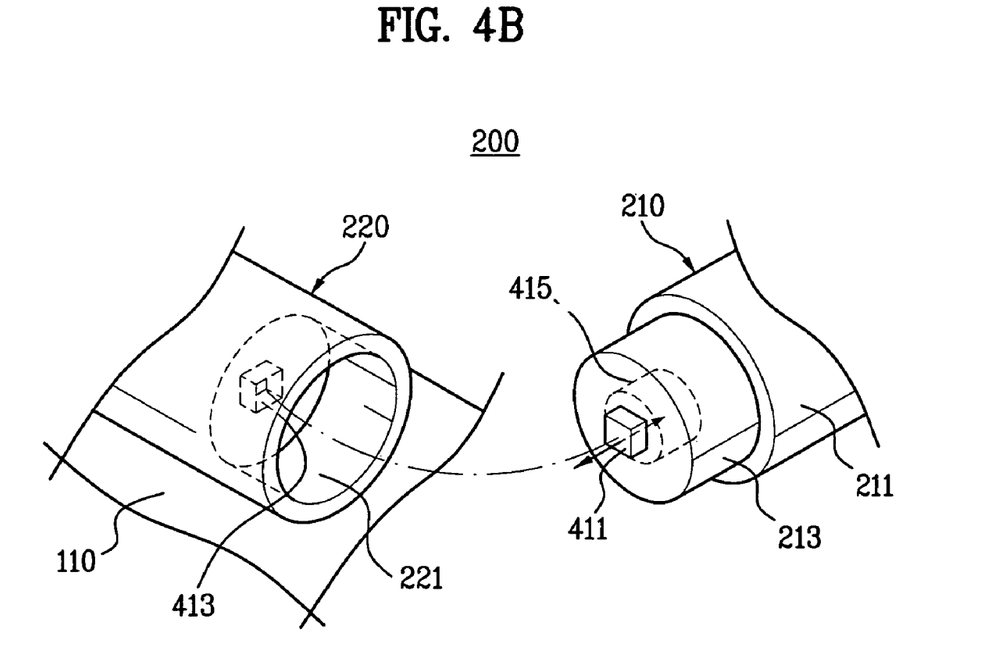
Figure 5:
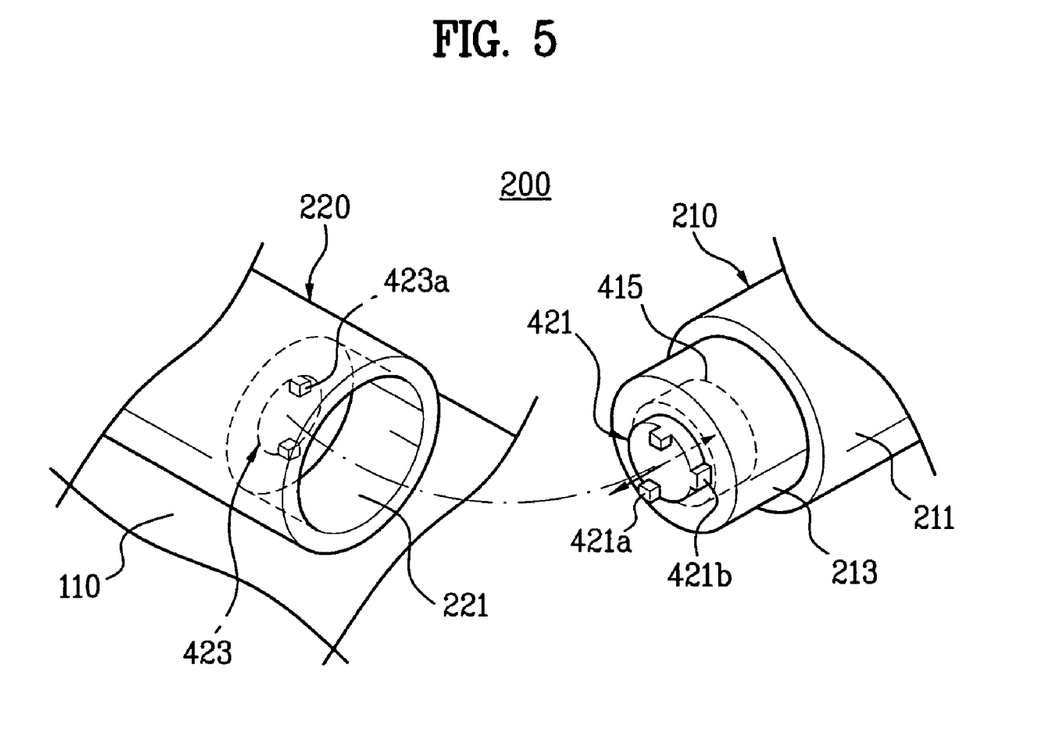

Generally, the locking device 400 includes an actuator 415 provided to either the first housing portion 110 or the second housing portion 120, an opening 413 provided to either the second housing portion 120 or the first housing portion 110, and an actuating piece 411 connected to the actuator 415 for selective insertion in the opening 413. In one embodiment, the actuating piece 411 is movable by the actuator 415 to selectively lock the housing 100 or to release the locked housing 100. The above-configured locking device 400 of the mobile communication terminal according to the present invention can be implemented by various example embodiments shown in FIGS. 3 to 5. Each of the embodiments depicted in FIGS. 3-5 is explained in detail below. Note, however, that other locking device configurations in addition to those explicitly described herein are contemplated as residing within the scope of the present invention. The following discussion is therefore not intended as limiting the present invention in any way.

Referring to FIG. 3, the actuator 415 is included in the first housing portion 110. The actuating piece 411 is connected to the actuator 415 in a manner such that the actuating piece extends beyond the upper surface of the first housing portion 110 as to be externally exposed. A long slot 111 is formed at the upper surface of the first housing portion 110 to accommodate extension the actuating piece 411 through the upper surface of the first housing portion 110. The actuating piece 411 is 'L'-shaped to define a hook and is slidably movable in a direction substantially parallel to the upper surface of the housing portion 110 and in alignment with the length of the slot 111. In the present embodiment, the actuator 415 includes a solenoid for selectively moving the actuating piece 411, though other devices are also possible. The opening 413 is defined on the lower surface of the second housing portion 120 and has a slot shape generally corresponding to the slot 111 of the first housing portion 110 The interior portion of the opening 413 is shaped so as to receive the hook-shaped portion of the actuating piece 411 in a locking engagement, as explained below. Preferably, the above-configured actuating piece 411 and opening 413, as shown in FIG. 3, are positioned relatively far away from the hinge 200.

In operation, the opening 413 of the above-configured locking device 400 receives the actuating piece 411 therein when the housing 100 is closed, i.e., when the second housing portion 120 is rotated about the hinge 200 so as to touch the first housing portion 110. In doing so, the actuating piece 411, is received by the slot-type opening 413. Once the housing 100 is fully closed, the hook of the actuating piece 411 is slidably moved by the actuator 415 or other suitable means including a spring force, in a direction substantially parallel to the upper surface of the housing portion 110 such that the hook engages the second housing portion 120 within the opening 413 to lock the housing 100 in a closed position. Later, when a user is authenticated via the authentication device 300, the actuator 415 moves the actuating piece 411 in a direction opposite the former direction, thereby disengaging the hook portion of the actuating piece from the opening 413 and unlocking of the housing 100. This in turn enables the first housing portion 110 to rotate about the hinge 200 away from the second housing portion 120, thereby opening the housing 100.

Reference is now made to FIGS. 4A and 4B, which each depict a locking device configured in accordance with additional example embodiments of the present invention. As shown in both FIGS. 4A and 4B, the actuator 415 is positioned in a first portion of the hinge 200 that is connected to one of the first and second housing portions 110 and 120, e.g., a middle portion 210 of the hinge 200 connected to the second housing portion 120, as shown in FIG. 3. The hinge middle portion 210, as shown in FIG. 4A and FIG. 4B, includes a first part 211 having a first diameter configured to be externally exposed and a second part 213 having a second diameter that is relatively smaller than that of the first part 211.

Similarly, the opening 413 defines a recess having a particular shape and is included in a second portion of the hinge 200 that is connected to a corresponding one of the first and second housing portions 110 and 120, e.g., an end portion 220 of the hinge 200 connected to the first housing portion 110, as shown in FIG. 3. The recessed opening 413 is defined in an inside surface of an insertion hole 221, as shown in FIG. 4A and FIG. 4B, that is provided in the end portion 220 of the hinge 200. As shown, the insertion hole 221 of hinge end portion 220 is sized and configured such that the second part 213 of the hinge middle portion 210 is received by the insertion hole 221.

As in the previous embodiment, the actuating piece 411 is connected to the actuator 415. In detail, the actuating piece 411 is included in the middle portion 210 of the hinge 200 and oriented for insertion in the recessed opening 413. FIGS. 4A and 4B depict differing engagement configurations for the actuating piece 411 and the recessed opening 413. In FIG. 4A, the actuating piece 411 is included on a portion of an outer circumference of the second part 213 of the hinge middle portion 210 and is selectively movable in a radial direction with respect to the axial length of the hinge 200. Correspondingly, the recessed opening 413 is included on an inner circumference of the insertion hole 221 into which the second part 213 is inserted.

Alternatively, the actuating piece 411 in FIG. 4B is included on the axial tip of the second part 213 of the hinge middle portion 210 and is selectively movable in an axial direction with respect to the hinge 200. Correspondingly, the recessed opening 413 is included on a bottom of the insertion hole 221 of the hinge end portion 220 into which the second part 213 is inserted.

In the assembled locking devices of FIGS. 4A and 4B, once the housing 100 is closed, the actuating piece 411 is selectively moved in the radial direction of the hinge 200 to engage the recessed opening 413 (FIG. 4A) or is selectively moved in the axial direction of the hinge 200 to engage the recessed opening 413 (FIG. 4B). With the actuating piece 411 inserted in the opening 413, the middle portion 210 of the hinge 200, which is connected to the second housing portion 120, is prevented from moving relative the end portion 220 of the hinge 200 that is connected to the first housing portion 110. In other words, the actuating piece 411 prevents the hinge middle portion 210 from rotating with respect to the hinge end portion 220, thereby maintaining the housing 100 in its closed state. Once a user is authenticated by the authentication device 300, however, the actuator 415 selectively moves the actuating piece 411 so as to disengage the actuating piece 411 from the opening 413. The middle portion 210 of the hinge 200 connected to the second housing portion 120 can then be rotated against the end portion 220 of the hinge 200 connected to the first housing portion 110, thereby enabling the housing 100 to be opened.

Reference is now made to FIG. 5 in describing yet another locking device for a mobile communication terminal according to one embodiment. Indeed, a locking device is shown in FIG. 5 that includes an actuator 415 provided to either a first housing portion 110 or a second housing portion 120, a first gear portion 423 provided to either the second housing portion 120 or the first housing portion 110, and a second gear portion 421 connected to the actuator 415 to selectively engage with the first gear portion 423 in order to lock or unlock the housing 100.

In detail, the actuator 415 shown in FIG. 5 is positioned in the middle portion 210 of the hinge 200 that is connected to the second housing portion 120. The first gear portion 423 is included on an inside of the end portion 220 of the hinge 200 that is connected to the first housing portion 110. More particularly, the first gear portion 423 is included on the bottom of the insertion hole 221. The first gear portion 423 includes at least one protrusion or tooth 423a protruding from the bottom of the insertion hole 221 in the axial direction of the hinge 200. The second gear portion 421 is provided at the axial end of the hinge middle portion 210 of the hinge 200 and is connected to the actuator 415. The second gear portion 421 is provided with at least one protrusion or tooth 421a that can correspondingly engage with the tooth 423a. The second gear portion 421 is moved in an axial direction of the hinge 200 by the actuator 415. And, a key 421b is formed on an outer circumference of the second gear portion 421 in a length direction. Hence, the second gear portion 421 does not rotate with respect to the actuator 415.

During operation of the above-configured locking device 400, if the housing 100 is closed, the second gear portion 421 can be selectively moved in the axial direction of the hinge 200 by the actuator 415 such that it engages with the first gear portion 423, causing the teeth 421a to engage the teeth 423a. As a result, the first housing portion 110 connected to the first gear portion 423 and the second housing portion 120 connected to the second gear portion 421 cannot mutually rotate about the hinge 200, thereby locking the housing 100 is its closed state. Once a user is authenticated by the authentication device 300, however, the actuator 415 retracts the second gear portion 421 to release the engagement between the first and second gear portions 423 and 421. This in turn enables rotation of the first and second housing portions 110 and 120 about the hinge 200 to unlock the housing 100.

In an example embodiment, the mobile communication terminal according to the present invention can further include a housing opening detector 500, depicted in FIG. 1, for detecting whether opening of the closed housing 100 is being initiated. In particular, the detector 500 provided to the housing 100 detects whether the housing 100 is about to be opened by detecting whether the first and second housing portions 110 and 120 of the closed housing 100 begin to move relative to one another. The detector 500 may include at least one of a magnet 511 and magnetic sensor 515, a pressure detecting sensor 520, and a variable resistor 530. These systems are explained in detail as follows.

Referring to FIG. 3, the magnet 511 is included in the first housing portion 110 and the magnetic sensor 515 is included in the second housing portion 120. Alternatively, the positions of the magnet 511 and the magnetic sensor 515 can be reversed. The magnetic sensor 515 is positioned so as to be substantially adjacent to the magnet 511 when the housing 100 is closed. In operation, the magnetic sensor 515 detects a magnetic field of the magnet 511. When the closed housing 100 is about to be opened, i.e., when the first and second housing portions 110 and 120 begin to make the relative motion with respect to one another, the relative distance between the magnet 511 and the magnetic sensor 515 varies, thereby altering the characteristics of the magnetic field detected by the magnetic sensor 515. Thus, the detector 500 is configured to detect imminent opening of the housing 100 when the magnetic sensor 515 detects the variation of the magnetic field provided by the magnet 511.

Referring to FIG. 3, according to one embodiment the pressure detecting sensor 520 is included in the second housing portion 120, while the first housing portion 110 is provided with a pad 113 that is brought into close proximity with the pressure detecting sensor 520 when the housing is closed 100. Alternatively, the relative positions of the pad 113 and the pressure detecting sensor 520 can be reversed. In operation, the detector 500 provided with the above pressure detecting configuration detects the pad 113 as it presses the pressure detecting sensor 520 with a predetermined pressure when the housing 100 is closed. When the housing 100 is about to be open, i.e., when the first and second housing portions 110 and 120 begin to move relative to one another, the pad 113 begins to detach or move away from a surface of the pressure detecting sensor 520 such that the contact pressure detected by the pressure detecting sensor 520 is lowered. Thus, the pressure detecting sensor 520 detects the reduction in contact pressure generated when the first and second housing portions 110 and 120 begin their relative motion, thereby detecting imminent opening of the housing 100.

In yet another embodiment, the detector 500 can include the variable resistor 530 (cf. FIG. 1). The variable resistor 530 is installed to contact with both the middle portion 210 of the hinge 200 connected to the second housing portion 120 and the end portion 220 of the hinge 200 connected to the first housing portion 110. If so, when the housing 100 is about to be open 100, i.e., when the first and second housing portions 110 and 120 start the relative motion, the middle portion 210 starts to rotate against the end portion 220 (see FIGS. 2 and 3). Upon the commencement of housing opening, relative positions of the middle portion 210 and the end portion 220 are changed, which in turn varies a resistance value measured by the variable resistor 530. As relative motion between the middle portion 210 and end portion 220 of the hinge 220 is indicative of relative of the first and second housing portions 110 and 120 when the housing is being opened, measurement by the variable resistor 530 of variation in the resistance value enables the detector 500 to detect whether the housing 100 is about to be opened.

Note that while a mobile terminal can include multiple detectors, in present embodiments only one of the aforementioned housing opening detectors need be included in the housing 100.

Once the above-configured detector 500 is provided to the housing 100, the auxiliary display 27b, which can be viewed by a user from outside the closed housing 100 with ease, outputs a message requesting user authentication when the closed housing 100 is about to be open. Hence, the user may initiate user authentication through the authentication device 300 with reference to the message displayed by the auxiliary display 27*b*.

In accordance with the above discussion, it is appreciated that in exemplary embodiments the housing 100 is locked by the locking device 400 once the housing 100 is closed and that the housing 100 is unlocked after completion of the user authentication via the authentication device 300. Yet, the present invention is not limited to this example. For instance, the locking device can be configured in one embodiment such that, even when the housing 100 is closed, the locking device does not lock the housing 100. However, when opening of the housing 100 is attempted without the user authentication via the authentication device 300, the locking device 400 is engaged and prevents the housing 100 from being opened or allows the housing 100 to be only slightly opened within a predetermined angle. Moreover, according to user's preference, the housing 100 can be configured to be locked whenever the housing 100 is closed. These and other locking configurations are therefore contemplated.

Figure 6:
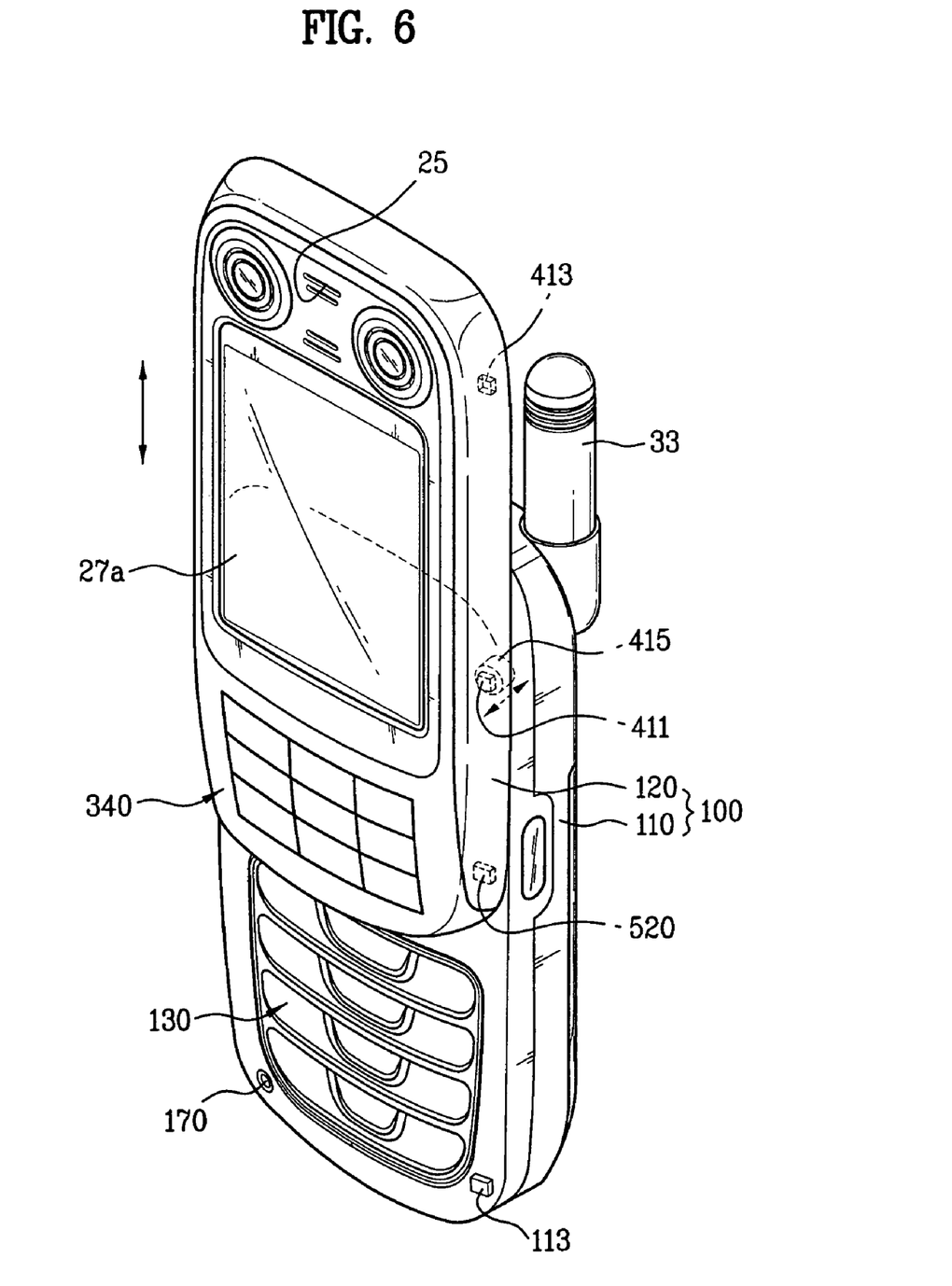
FIG. 6 is a perspective view of a mobile communication terminal according to a another embodiment of the present invention, depicting the mobile terminal in an unfolded state.
Figure 7:
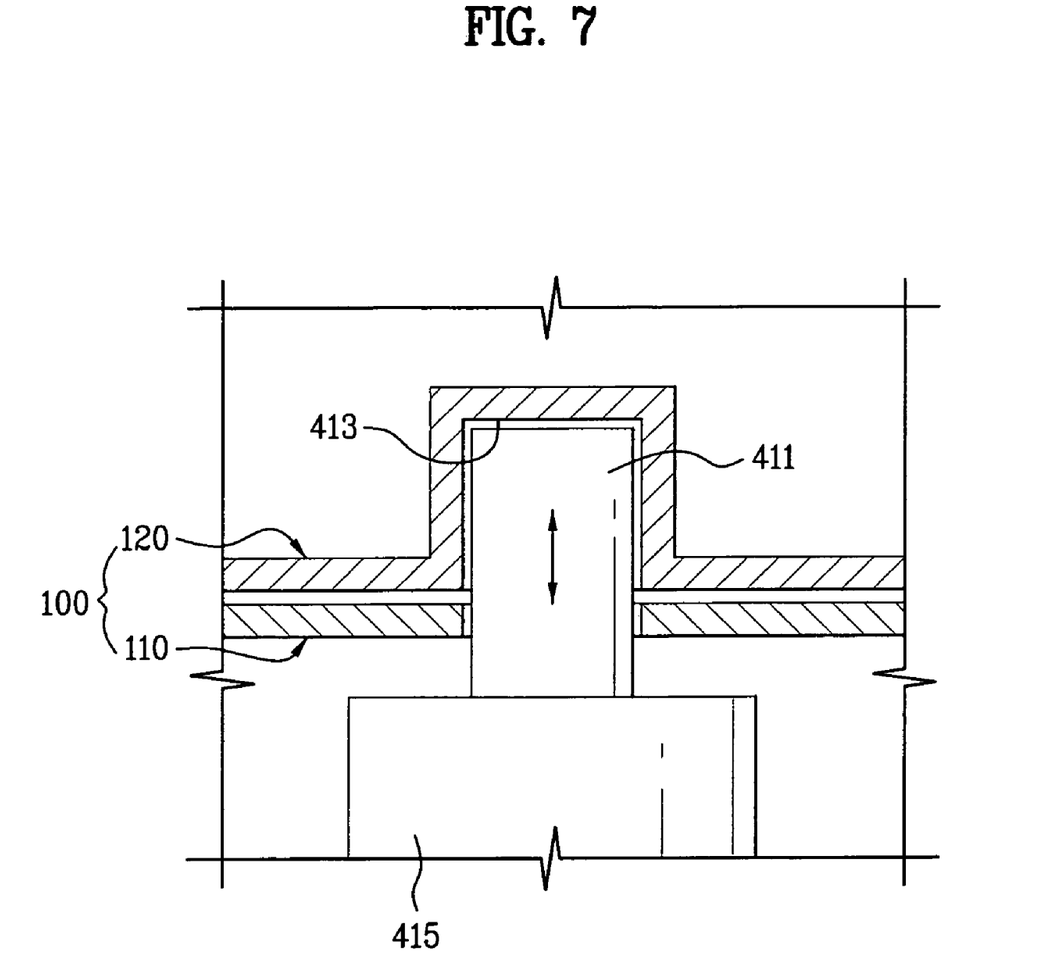
FIG. 7 is a cross-sectional view of a locking device of a mobile communication terminal according to a second embodiment of the present invention.

In the above described example embodiments, the present invention is applied to a folding or clamshell-type terminal. However, the present invention is not limited only to this embodiment. Indeed, as shown in FIGS. 6 and 7, embodiments of the present invention can be applied to other terminal types, such as a slide-type terminal. Thus, another embodiment of the present invention is explained in detail with reference to FIG. 6 and FIG. 7 as follows. In describing this embodiment, identical or like elements contained in previous embodiments will not be explained in detail.

Referring to FIG. 6, a housing 100 of a mobile communication terminal according to a another embodiment of the present invention includes a first housing portion 110 and a second housing portion 120, which are slidably joined to each other. The housing 100 is configured to be opened or closed as the first and second housing portions 110 and 120 slide relative to each other. Such sliding movement is provided by a rail (not shown in the drawing) disposed on either the first housing portion 110 or the second housing portion 120 and a guide protrusion (not shown in the drawing), which is also disposed on either the second housing portion or first housing portion that couples to and cooperates with the rail to guide the sliding movement of the of the first and second housing portions relative to one another. The rail and guide configuration briefly explained here is well known and not described in detail here.

A keypad 21 and a microphone 23 are provided to an upper surface of the first housing portion 110, and a main display 27*a* and a speaker 25 are provided to an upper surface of the second housing portion 120. An authentication device 300 is provided to the upper surface of the second housing portion 120. An exemplary authentication device 300 implemented as an authentication keypad 340 is shown in FIG. 6. Alternatively, various other authentication devices, including a fingerprint identifier 310, an iris identifier 320, a voice identifier 330 and the like can also be implemented as the authentication device 300.

A locking device 400 of the terminal housing 100 includes an actuator 415, a recess-type opening 413 and an actuating piece 411. The actuator 415, as shown in FIG. 6 and FIG. 7, is provided to the first housing portion 110. The recess type opening 413 is provided to a lower surface of the second housing portion 120. And, the actuating piece 411 extends beyond the upper surface of the first housing portion 110 and is connected to the actuator 415 so as to be selectively inserted in the recessed opening 413. Hence, the actuating piece 411 is moved by selective operation of the actuator 415 in a vertical direction that is substantially perpendicular to the upper surface of the housing portion 100 so as to be removably inserted in the opening 413.

The above-configured locking device 400 locks the housing 100 so as to prevent opening thereof while the housing 100 is closed. Once a user is authenticated via the authentication device 300, however, the locking device 400 unlocks the housing 100 so as to permit its opening. Alternatively, the locking device 400 can be configured to prevent the housing 100 from being opened or to prevent the first and second housing portions 110 and 120 from sliding more than a predetermined distance when opening of the closed housing 100 is attempted without prior user authentication through the authentication device 300.

Moreover, the mobile communication terminal according to the present embodiment of the present invention can further include a housing opening detector 500 (FIG. 1) that detects whether the housing 100 is about to be opened as the first and second housing portions 120 are initially moved relative to one another. A magnet 511 and magnetic sensor 515, pressure detecting sensor 520, variable resistor 530 and the like can be used as the detector 500 in a similar manner to that described in above embodiments of the present invention.

The housing opening detector 500 is implemented as the pressure detecting sensor 520 in the embodiment shown in FIG. 6. In detail, the pressure detecting sensor 520 is provided to the lower surface of the second housing portion 120. A pad 113, which is brought into proximate contact with the pressure detecting sensor 520 when the housing 100 is closed, is provided to the upper surface of the first housing portion 110. Alternatively, the relative positions of the pressure detecting sensor 520 and the pad 113 can be reversed. In operation, when opening of the housing 100 is initiated, the pad 113 is incrementally moved from its position proximate a surface of the pressure detecting sensor 520 such that the pressure detecting sensor 520 detects a variation of contact pressure. Hence, an indication of contact pressure variance enables the detector 500 to determine that opening of the housing 100 is being initiated.

Although not shown in FIG. 6, the magnet 511/magnetic sensor 515 and variable resistor 530 can be alternatively provided to the first and second housing portions 110 and 120 to act 6 as the housing opening detector 500. For instance, by providing the magnet 511 and the magnetic sensor 515 to the first housing portion 110 and the second housing portion 120, respectively, the magnetic sensor 515 can detect a variation of intensity of a magnetic field of the magnet 511 when the second housing portion 120 begins to slide with respect to the first housing portion 110. Or, by installing the variable resistor 530 at each of the first and second housing portions 110 and 120, the variable resistors 530 can detect the variation of resistance when the first and second housing portions 110 and 120 begin to slide with respect to each other.

In the configurations of the housing opening detector 500 described above the detector 500, upon detecting the relative motion of the first and second housing portions 110 and 120 while the housing 100 is closed, can enable a message requesting user authentication to be displayed on the display provided to the upper surface of the second housing portion for the user's convenience.

The mobile communication terminal according to the various embodiments of the present invention as described above can be configured such that, if opening of the housing 100 is attempted while the housing 100 is closed, a message requesting user authentication is displayed on the auxiliary display 27*b* on the exterior of the housing 100 (FIG. 2) or the main display 27*a* (FIG. 6). If so, a user can then authenticate via the authentication device 300, according to the displayed message. The authentication device 300 can then perform the necessary authentication procedures, including comparing inputted information, read for instance via the fingerprint identifier 310, voice identifier 330, iris identifier 320 or authentication keypad 340, to the registered user authentication information.

If the user is authenticated as a registered user by the authentication device 300, the actuator 415 of the locking device 400 actuates the actuating piece 411 to release its locking engagement of the housing 100 so that the user can use the mobile communication terminal as intended according to the present invention. If the user fails in being authenticated as the registered user, however, the locking device 400 maintains the locked state of the housing 100. As such, an unauthorized user is unable to open the housing 100, and is therefore unable to use the mobile communication terminal and is further prevented from accessing privileged, sensitive, or confidential information contained or accessed by the terminal, according to the present invention.

In the aforesaid description of various example embodiments of the present invention, it has been described that the locking device merely prevents the opening of the housing. Yet, the present invention can be further configured in another embodiment to prevent operation of driving software or other functionality of the mobile communication terminal as well. For instance, the terminal can be configured such that financial debit or credit card functionality, which is typically enabled by the terminal when the user is authenticated, is disabled in the case of invalid user authentication. As such, even if the locking device is physically broken such that the housing can be opened, the mobile communication terminal is nonetheless non-functional, thereby preserving the security of the device.

In accordance with the above-described embodiments, the housing of the mobile communication terminal according to the present invention is selectively opened and accessed according to user authentication via the authentication device. Hence, only an authorized user can open and use the mobile communication terminal according to the present invention. Should the terminal be lost or stolen, therefore, the terminal will remain locked and even non-functional for an unauthorized user. As such, personal, banking, and other sensitive or confidential information stored in the mobile communication terminal is prevented from unintended disclosure.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A mobile communication terminal comprising:
a folding housing including first and second housing portions that are joined via a hinge;
an authentication means for enabling user authentication while the housing is in a closed state, the authentication means included on an exterior of the housing; and
a locking means comprising:
an actuator included in a first portion of the hinge that is connected to either the first housing portion or the second housing portion;
a recess included in a second portion of the hinge that is connected to either the second housing portion or the first housing portion; and
an actuating piece connected to the actuator and configured for selective insertion in the recess, wherein the actuating piece locks the housing when the actuating piece is inserted in the recess, wherein the actuating piece is included on an outer circumference of the first hinge portion, wherein the recess is included in an inner circumference of the second hinge portion, the portion of the first hinge portion having the actuating piece being received by the second hinge portion inner circumference, and wherein the actuating piece extends radially with respect to the hinge to selectively engage the recess.

2. A mobile communication terminal comprising:
a folding housing including first and second housing portions that are joined via a hinge;
an authentication means for enabling user authentication while the housing is in a closed state, the authentication means included on an exterior of the housing; and
a locking means comprising:
an actuator included in a first portion of the hinge that is connected to either the first housing portion or the second housing portion;
a recess included in a second portion of the hinge that is connected to either the second housing portion or the first housing portion; and
an actuating piece connected to the actuator and configured for selective insertion in the recess, wherein the actuating piece locks the housing when the actuating piece is inserted in the recess, wherein the actuating piece is included on an axial end of the first hinge portion, wherein the recess is included in an inner circumference of the second hinge portion, the portion of the first hinge portion having the actuating piece being received by the second hinge portion inner circumference, and wherein the actuating piece moves axially with respect to the hinge to selectively engage the recess.

3. A mobile communication terminal comprising:
a folding housing including first and second housing portions that are joined via a hinge;
an authentication means for enabling user authentication while the housing is in a closed state of the housing, the authentication means included on an exterior of the housing; and
a locking means comprising:
an actuator included in a first portion of the hinge that is connected to either the first housing portion or the second housing portion;
a first gear portion included on a second portion of the hinge that is connected to either the second housing portion or the first housing portion; and
a second gear portion connected to the actuator and configured to selectively engage with the first gear portion such that the housing is locked when second gear portion is engaged with the first gear portion, wherein the second gear portion is included on an axial end of the first hinge portion, wherein the first gear portion is included in an inner circumference of the second hinge portion, the portion of the first hinge portion having the second gear portion being received by the second hinge portion inner circumference, and wherein the second gear portion moves axially with respect to the hinge to selectively engage the first gear portion.

4. The mobile communication terminal of claim 3, wherein the second gear portion includes a key on an outer circumference of the second gear portion, the key configured to prevent the second gear portion from being rotated with respect to the actuator.

5. The mobile communication terminal of claim 3, wherein the folding housing has a clamshell design.

* * * * *